(12) United States Patent
Uchino et al.

(10) Patent No.: US 11,898,632 B2
(45) Date of Patent: Feb. 13, 2024

(54) SHIFT LEVEL SELECTION DEVICE AND VEHICLE

(71) Applicant: ISUZU MOTORS LIMITED, Tokyo (JP)

(72) Inventors: Atsushi Uchino, Fujisawa (JP); Yoshitaka Kanda, Fujisawa (JP); Susumu Tsunoda, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 17/904,378

(22) PCT Filed: Feb. 16, 2021

(86) PCT No.: PCT/JP2021/005642
§ 371 (c)(1),
(2) Date: Aug. 17, 2022

(87) PCT Pub. No.: WO2021/166887
PCT Pub. Date: Aug. 26, 2021

(65) Prior Publication Data
US 2023/0076625 A1  Mar. 9, 2023

(30) Foreign Application Priority Data

Feb. 19, 2020 (JP) ................................. 2020-026289

(51) Int. Cl.
*F16H 61/02* (2006.01)
*F16H 59/44* (2006.01)
*F16H 59/66* (2006.01)
*F16H 61/68* (2006.01)

(52) U.S. Cl.
CPC ............. *F16H 59/44* (2013.01); *F16H 59/66* (2013.01); *F16H 61/02* (2013.01); *F16H 61/68* (2013.01)

(58) Field of Classification Search
CPC .......... F16H 59/44; F16H 59/66; F16H 61/02; F16H 61/68
See application file for complete search history.

(56) References Cited

U.S. PATENT DOCUMENTS

| 5,925,087 A | 7/1999 | Ohnishi |
| 2005/0085977 A1 | 4/2005 | Suzuki |
| 2009/0093936 A1 | 4/2009 | Lindgren et al. |

(Continued)

FOREIGN PATENT DOCUMENTS

| CN | 1609480 A | 4/2005 |
| CN | 101038030 A | 9/2007 |

(Continued)

OTHER PUBLICATIONS

International Search Report of PCT/JP2021/005642 dated Apr. 13, 2021.

*Primary Examiner* — Edwin A Young
(74) *Attorney, Agent, or Firm* — Shih IP Law Group, PLLC

(57) ABSTRACT

A shift level selection device comprising: a setting unit that sets a selection range in which the lowest speed shift level is a first shift level used in a set-off shift level among two or more shift levels; and a changing unit that, in accordance with the first shift level used in the set-off shift level, changes the selection range so that the lowest speed shift level is a second shift level, which is a lower speed than the first shift level.

9 Claims, 3 Drawing Sheets

(56) References Cited

U.S. PATENT DOCUMENTS

| | | | |
|---|---|---|---|
| 2010/0048354 A1 | 2/2010 | Leibbrandt et al. | |
| 2011/0281685 A1* | 11/2011 | Allgaier | F16H 61/0028 |
| | | | 180/65.265 |
| 2013/0317720 A1* | 11/2013 | Kaita | F16H 61/12 |
| | | | 701/99 |
| 2017/0335951 A1* | 11/2017 | Fukuda | F16H 61/0031 |
| 2017/0335960 A1* | 11/2017 | Nagata | F16H 59/54 |
| 2021/0088129 A1 | 3/2021 | Ooshima et al. | |

FOREIGN PATENT DOCUMENTS

| | | |
|---|---|---|
| CN | 101326389 A | 12/2008 |
| CN | 101660601 A | 3/2010 |
| CN | 110709626 A | 1/2020 |
| DE | 102018009467 A1 | 7/2019 |
| JP | H06-147304 A | 5/1994 |
| JP | 10-238617 A | 9/1998 |
| JP | 11-325227 A | 11/1999 |
| JP | 2000193084 A | 7/2000 |
| JP | 2002-054730 A | 2/2002 |
| JP | 2018080715 A | 5/2018 |
| JP | 2019-173765 A | 10/2019 |

\* cited by examiner

SHIFT LEVEL SELECTION DEVICE AND VEHICLE

TECHNICAL FIELD

The present disclosure relates to a gear position selection apparatus and a vehicle.

BACKGROUND ART

In the related art, there is known a transmission in which, among a plurality of gear positions, two or more gear positions are set as gear positions for a vehicle-start gear position (for example, see Patent Literature (hereinafter referred to as "PTL") 1). In such a configuration, an optimum vehicle-start gear position is selected in accordance with a gradient of a road surface or the like when a vehicle stops, for example.

Further, in the related art, a selection range of a plurality of gear positions selectable between when a vehicle starts moving and when the vehicle stops moving during automatic transmission traveling is set. This selection range is set such that, among two or more gear positions set for a vehicle-start gear position, a gear position of the two or more gear positions used as the vehicle-start gear position is a lowest-speed gear position, and one gear position is selected from the selection range in accordance with a traveling condition of the vehicle.

CITATION LIST

Patent Literature

PTL 1
Japanese Patent Application Laid-Open No. 2002-54730

SUMMARY OF INVENTION

Technical Problem

In the configuration in the related art, however, a lowest-speed gear position in a selection range of gear positions is a gear position used as a vehicle-start gear position until a vehicle stops moving. Accordingly, for example, in a case where a vehicle starts moving with a downward gradient or the like, a gear position on a relatively higher-speed side among gear positions selectable for the vehicle-start gear position becomes a lowest-speed gear position.

As described above, when a selection range of gear positions is limited by a vehicle-start gear position, there is a risk that in a case where a vehicle travels on a road surface with an upward gradient, which requires a relative driving force, before the vehicle stops moving, it will be impossible to select a lower-speed gear position, albeit it exists, than the selection range of gear positions and that there will be an insufficient driving force.

An object of the present disclosure is to provide a gear position selection apparatus and a vehicle each capable of suppressing an insufficient driving force of the vehicle due to a limitation on a selection range of gear positions by a vehicle-start gear position.

Solution to Problem

A gear position selection apparatus according to the present disclosure is a gear position selection apparatus of a transmission including a plurality of gear positions, where the plurality of gear positions includes two or more gear positions set for a vehicle-start gear position of a vehicle. The gear position selection apparatus includes:

a setting section that sets a selection range of the plurality of gear positions selectable between when the vehicle starts moving and when the vehicle stops moving during automatic transmission traveling, where the selection range is a range in which, among the two or more gear positions, a first gear position of the two or more gear positions used as the vehicle-start gear position is a lowest-speed gear position; and a changing section that changes, in accordance with the first gear position used as the vehicle-start gear position, the selection range such that the lowest-speed gear position is a second gear position of the two or more gear positions that is a lower-speed gear position than the first gear position.

A vehicle according to the present disclosure includes:

a transmission including a plurality of gear positions, where the plurality of gear positions includes two or more gear positions set for a vehicle-start gear position of a vehicle; and the gear position selection apparatus described above.

Advantageous Effects of Invention

According to the present disclosure, it is possible to suppress an insufficient driving force of a vehicle due to a limitation on a selection range of gear positions by a vehicle-start gear position.

DESCRIPTION OF EMBODIMENTS

Figure 1:
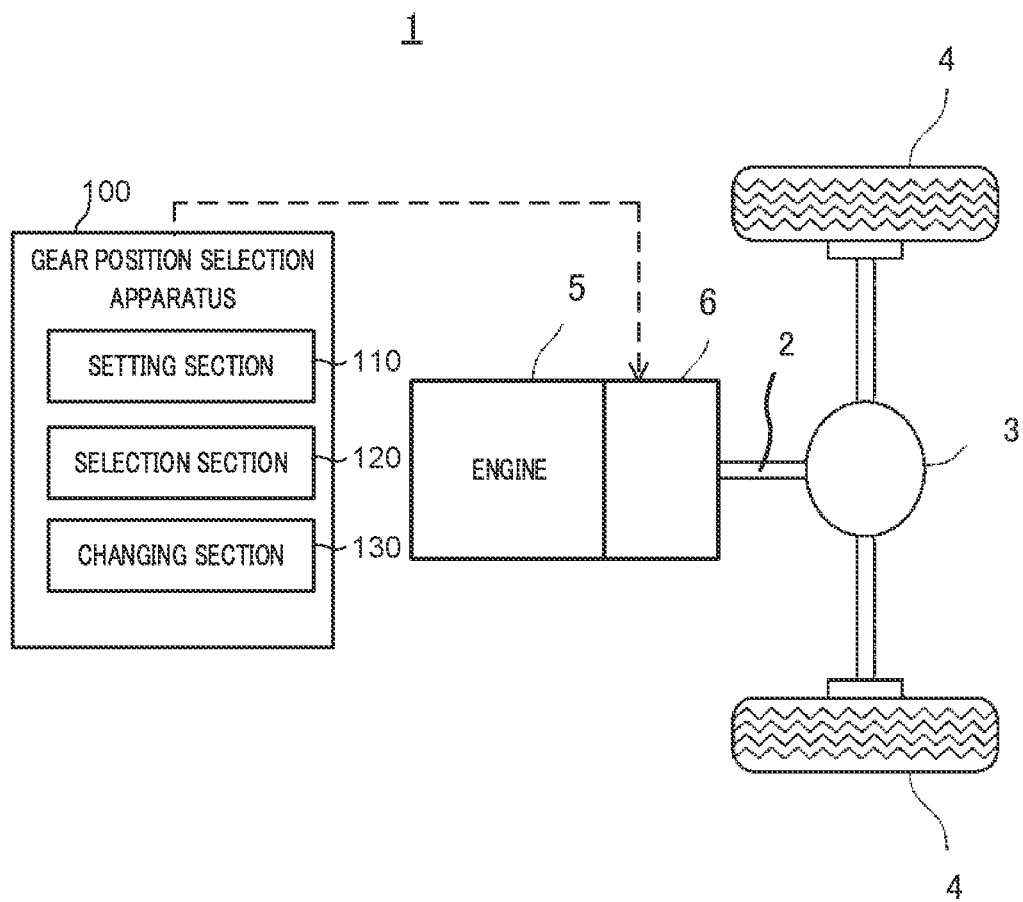
FIG. 1 illustrates a configuration of a vehicle including the gear position selection apparatus according to an embodiment of the present disclosure.

Hereinafter, the present embodiment will be described in detail with reference to the accompanying drawings. FIG. 1 illustrates a configuration of vehicle 1 including gear position selection apparatus 100 according to an embodiment of the present disclosure.

As illustrated in FIG. 1, vehicle 1 includes propeller shaft 2, differential gear 3, driving wheels 4, engine 5, transmission 6, and gear position selection apparatus 100.

Engine 5 is, for example, an internal combustion engine such as a diesel engine (driving source). The power of engine 5 is transmitted to transmission 6 through a clutch (not illustrated), and the power transmitted to transmission 6 is transmitted to driving wheels 4 through propeller shaft 2 and differential gear 3.

Transmission 6 is a transmission such as an automatic transmission (for example, an automated manual transmission (AMT)), and forms a plurality of gear positions. In other words, transmission 6 includes a transmission mechanism or the like that connects or disconnects an output shaft of engine 5 with or from propeller shaft 2 and changes the transmission ratio.

Transmission 6 sets, among the plurality of gear positions, three gear positions for a vehicle-start gear position of vehicle 1. One of the three gear positions described above for the vehicle-start gear position is selected by gear position selection apparatus 100 to be described later when vehicle 1 starts moving.

In the present embodiment, three gears of first, second, and third gears are set as gear positions for the vehicle-start gear position. The first gear is a gear position that is lowest in speed among the three gear positions. The second gear is a higher-speed gear position than the first gear, and is mainly set when a road surface when a vehicle starts moving is a flat road or the like. The third gear is a gear position that is highest in speed among the three gear positions, and is mainly set when a gradient when a vehicle starts moving is a downward gradient.

Note that, the plurality of gear positions in transmission 6 includes gear positions whose number is more than the number of the gear positions for the vehicle-start gear position, and includes, in addition to the gear positions for the vehicle-start gear position, higher-speed gear positions (for example, fourth, fifth, and sixth gears in the present embodiment) than the gear positions for the vehicle-start gear position.

Gear position selection apparatus 100 includes a central processing unit (CPU) (not illustrated), a read only memory (ROM) (not illustrated), a random access memory (RAM) (not illustrated), and input-output circuitry (not illustrated). Gear position selection apparatus 100 controls the settings of the gear positions of transmission 6 of vehicle 1 based on a preset program.

Gear position selection apparatus 100 includes setting section 110, selection section 120, and changing section 130.

Setting section 110 sets one of the plurality of gear positions in transmission 6 as a gear position for vehicle 1 to travel during automatic transmission traveling of vehicle 1. Specifically, when vehicle 1 stops, setting section 110 sets one gear position (first gear position) from a setting range (the first, second, and third gears) for the vehicle-start gear position in transmission 6 based on information from a gradient sensor or the like (not illustrated).

Further, setting section 110 sets a selection range of the plurality of gear positions selectable between when vehicle 1 starts moving and when vehicle 1 stops moving during automatic transmission. The selection range is set such that the first gear position used as the vehicle-start gear position is a lowest-speed gear position.

Selection section 120 performs selection of one gear position from the selection range described above in accordance with a traveling condition of vehicle 1. During automatic transmission traveling of vehicle 1, setting section 110 sets a gear position of transmission 6 based on a result of the selection by selection section 120.

Specifically, in a case where setting section 110 sets, for example, the third gear as the vehicle-start gear position when vehicle 1 stops, setting section 110 sets a selection range, in which the third gear (the first gear position) is the lowest-speed gear position, as a range in which the gear positions of transmission 6 are selectable. The gear positions set as the gear positions in the selection range described above are the third gear and higher-speed gear positions than the third gear.

Note that, in the present embodiment, the gear positions of transmission 6 are settable from the first gear to the sixth gear. Accordingly, the gear positions to be set as the gear positions in the selection range described above are four gear positions of the third, fourth, fifth, and sixth gears.

Changing section 130 changes the selection range described above in accordance with the gear position (the first gear position) used as the vehicle-start gear position such that the lowest-speed gear position is a second gear position in the setting range for the vehicle-start gear position that is a lower-speed gear position than the first gear position. Specifically, changing section 130 changes the selection range in a case where the first gear position is a gear position included in, between a higher-speed side and a lower-speed side in the setting range for the vehicle-start gear position, the higher-speed side.

For example, the third gear in the setting range of the first, second, and third gears is on the higher-speed side in the setting range for the vehicle-start gear position. For example, the first gear in the setting range of the first, second, and third gears is on the lower-speed side in the setting range for the vehicle-start gear position.

Figure 2A:
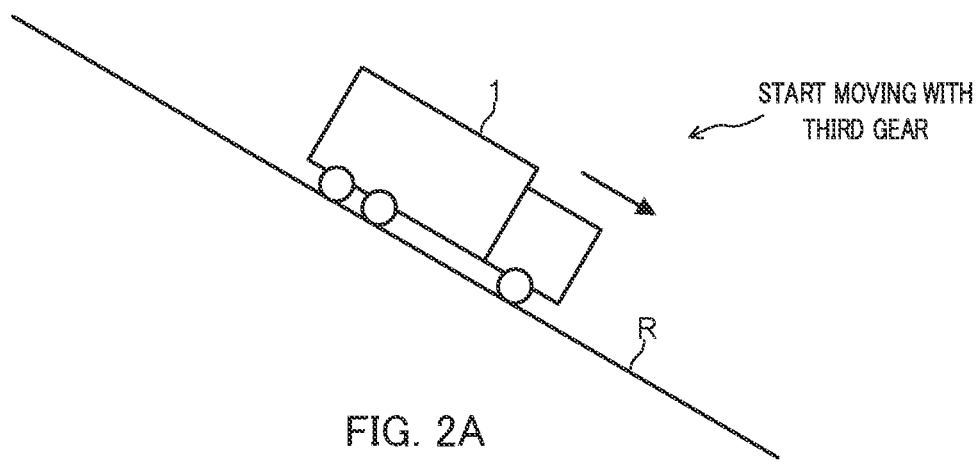
FIG. 2A is a diagram provided for describing an example of gear position selection by the gear position selection apparatus.

For example, as illustrated in FIG. 2A, it is assumed that vehicle 1 starts moving from a position at which a gradient of road surface R is a downward gradient. Further, road surface R with the downward gradient in FIG. 2A then becomes road surface R illustrated in FIG. 2B, which is flat, followed by road surface R with an upward gradient illustrated in FIG. 2C.

Figure 2B:
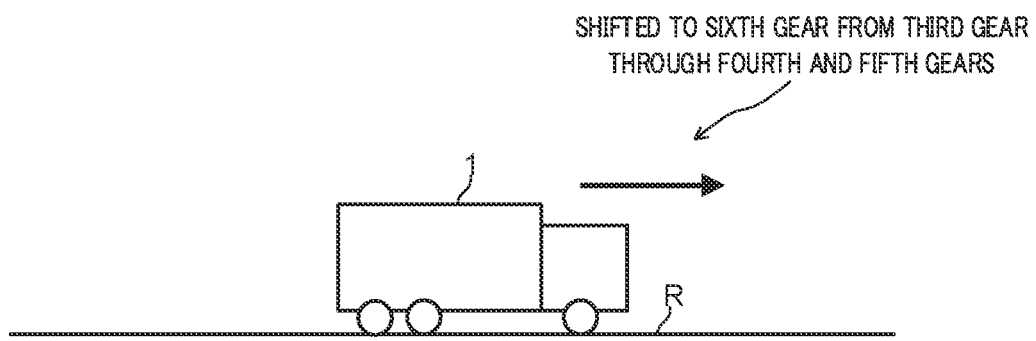
FIG. 2B is a diagram provided for describing an example of the gear position selection by the gear position selection apparatus.
Figure 2C:
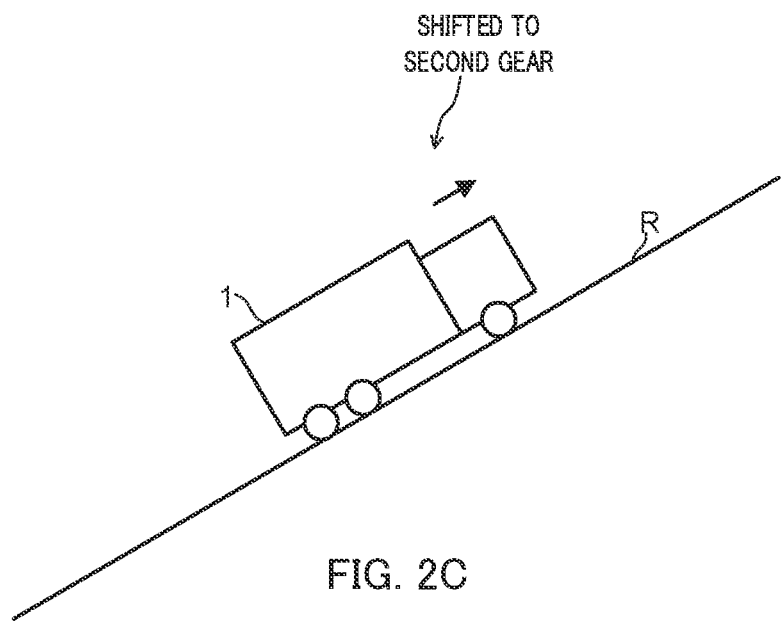
FIG. 2C is a diagram provided for describing an example of the gear position selection by the gear position selection apparatus.

In this case, vehicle 1 starts moving with the third gear set for the vehicle-start gear position. The gear position is shifted as vehicle 1 travels. Specifically, as illustrated in FIG. 2B, vehicle 1 gradually increases the speed after starting moving and the gear position is set to the sixth gear from the third gear through the fourth and fifth gears, for example. Then, as illustrated in FIG. 2C, vehicle 1 travels on road surface R with an upward gradient after traveling on road surface R which is flat.

Here, in a case where the gear position is in a selection range from the third gear to the sixth gear, there may be an insufficient driving force of vehicle 1 while traveling on road surface R with an upward gradient. For example, the problem of the insufficient driving force notably occurs in a case where vehicle 1 reduces the speed while traveling on an upward gradient and then attempts to accelerate again.

This is because in a case where vehicle 1 attempts to accelerate again after the gear position of transmission 6 is shifted down by a reduction in the speed by vehicle 1, a required driving force is substantially close to a driving force when vehicle 1 starts moving in a state in which vehicle 1 has stopped at a position with an upward gradient. Since the third gear, which is the vehicle-start gear position at a position with a downward gradient, is the lowest-speed gear position in the selection range during automatic transmission traveling, only selection up to the third gear in the gear positions of transmission 6 is possible unless vehicle 1 stops moving. As a result, even when vehicle 1 attempts to accelerate again, it is impossible to select a gear position suitable for an upward gradient, which results in an insufficient driving force.

In the present embodiment, on the other hand, in a case where the third gear is the vehicle-start gear position, changing section 130 changes the third gear to, for example, the second gear (the second gear position) that is a lower-speed gear position than the third gear (the first gear position) in terms of the lowest-speed gear position. Thus, the second gear position that is a lower-speed gear position than the first gear position becomes selectable so that the insufficient driving force as described above can be suppressed.

Further, changing section 130 does not change the selection range in a case where the first gear position is the first gear or the second gear. Since the gear positions of the first and second gears are gear positions with a sufficient driving force, the problem of the insufficient driving force described above is unlikely to occur even when the selection range is not changed. Accordingly, in such a case, it is possible to simplify the control by not changing the selection range.

Further, changing section 130 may also change the selection range in a case where vehicle 1 travels at a predetermined speed after starting moving or in a case where the gear position in transmission 6 is shifted from the first gear position after vehicle 1 starts moving.

It is considered that the state in which the gear position remains the first gear position and is not changed after vehicle 1 start moving is a state in which vehicle 1 does not increase the speed so much and is a state in which vehicle 1 can immediately stop moving in some cases. Accordingly, the selection range is not changed in such a case. That is, it is possible to suppress a redundant change in a selection range by not changing the selection range until vehicle 1 travels to some extent.

Figure 3:
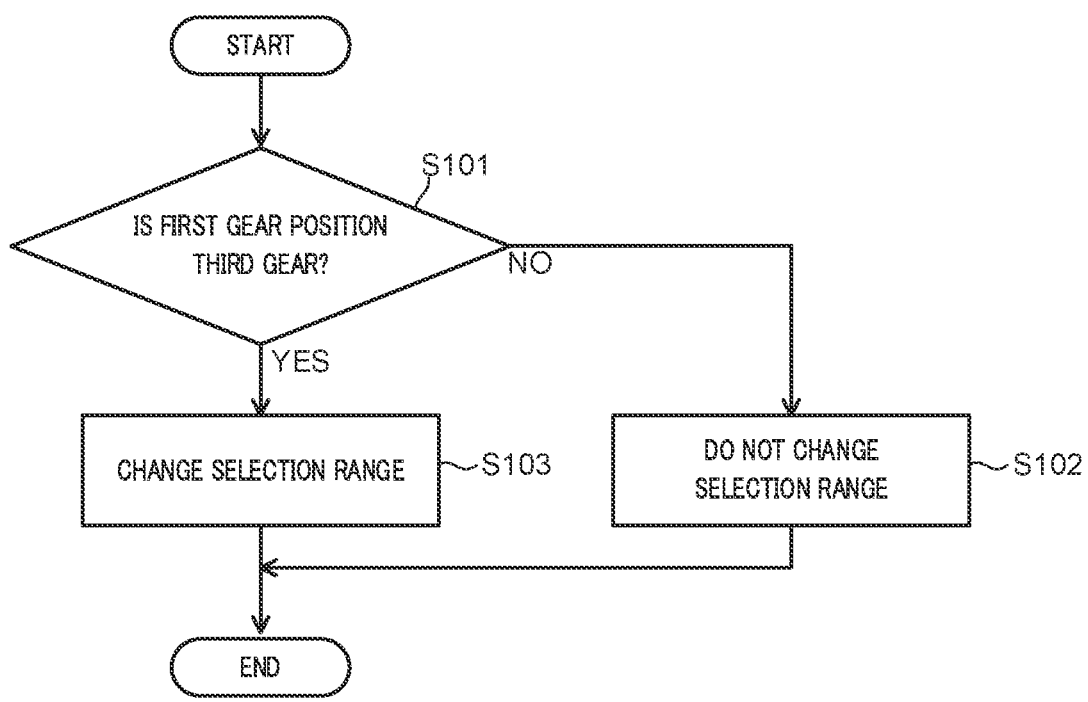
FIG. 3 illustrates a flowchart for an operation example of control of setting a selection range of gear positions in the gear position selection apparatus.

Next, an operation example of control of setting a selection range of gear positions in gear position selection apparatus 100 will be described. FIG. 3 illustrates a flowchart for an operation example of control of setting a selection range of gear positions in gear position selection apparatus 100. The processing in FIG. 3 is appropriately executed when vehicle 1 starts moving, for example. Note that, when vehicle 1 starts moving, one gear position of gear positions for a vehicle-start gear position is set as a first gear position, and a selection range in which the first gear position is a lowest-speed gear position is set.

As illustrated in FIG. 3, gear position selection apparatus 100 determines whether the first gear position is the third gear (step S101). In a case where the first gear position is not the third gear as a result of the determination (step S101, NO), gear position selection apparatus 100 does not change the selection range of gear positions (step S102).

In a case where the first gear position is the third gear (step S101, YES), on the other hand, gear position selection apparatus 100 changes the selection range of gear positions (step S103). This control ends after step S102 or step S103.

According to the present embodiment configured as described above, the selection range is changed in accordance with the first gear position used as the vehicle-start gear position such that the lowest-speed gear position is a second gear position of the gear positions for the vehicle-start gear position that is a lower-speed gear position than the first gear position. Accordingly, when vehicle 1 travels on a road surface requiring a driving force, the second gear position that is a lower-speed gear position than the first gear position can be selected so that it is possible to suppress an insufficient driving force of vehicle 1 while traveling on the aforementioned road surface.

That is, the present embodiment makes it possible to suppress an insufficient driving force of vehicle 1 due to a limitation on a selection range of gear positions by a vehicle-start gear position.

Note that, in the embodiment described above, the selection range of gear positions is changed in a case where the first gear position is the third gear, but the present disclosure is not limited thereto. For example, changing section 130 may change the selection range in a case where the first gear position is a higher-speed gear position than a gear position that is lowest in speed in a setting range for the vehicle-start gear position.

For example, in the case of the embodiment described above, the selection range of gear positions may be changed even when the first gear position is the second gear. In this case, the selection range of gear positions is changed such that the lowest-speed gear position is the first gear that is a lower-speed gear position than the second gear.

Further, in the embodiment described above, three gear positions (the first, second, and third gears) have been set for the vehicle-start gear position, but the present disclosure is not limited thereto, and two or more gear positions may be set for the vehicle-start gear position.

Further, in the embodiment described above, the selection range is changed in a case where the first gear position is the third gear included in, between a higher-speed side and a lower-speed side in the setting range for the vehicle-start gear position, the higher-speed side, but the first gear position for changing the selection range may be appropriately adjusted in accordance with the number of gear positions set for the vehicle-start gear position.

For example, in a case where the gear positions for the vehicle-start gear position are four gear positions (the first, second, third, and fourth gears), the gear positions included in the higher-speed side in the setting range for the vehicle-start gear position are the third and fourth gears. Accordingly, the selection range may be changed in a case where the third or fourth gear is the first gear position, or the selection range may be changed only in a case where the fourth gear is the first gear position.

Further, in the embodiment described above, the selection range of gear positions is changed based on the first gear position being a gear position on a higher-speed side, but the present disclosure is not limited thereto. For example, changing section 130 may determine whether the selection range is changed in accordance with a gradient of a road surface on which vehicle 1 travels.

In a case where vehicle 1 starts moving on a road surface with a downward gradient or on a flat road surface and then travels on a road surface with a lot of upward gradients, changing section 130 determines that the selection range is changed. Further, in a case where vehicle 1 travels on a road surface that does not change in gradient after starting moving, changing section 130 determines that the selection range is not changed.

In this way, the control for changing a selection range can be performed only when needed so that it is possible to suppress that the control is frequently performed.

Further, in the embodiment described above, transmission 6 includes six gear positions, but the present disclosure is not limited thereto, and transmission 6 may include an arbitrary number of gear positions as long as the number renders two or more gear positions for the vehicle-start gear position settable.

Further, in the embodiment described above, the setting section, the selection section, and the changing section are configured to be incorporated into the gear position selection apparatus, but the present disclosure is not limited thereto, and the setting section, the selection section, and the changing section may be configured separately.

Further, in the embodiment described above, the AMT has been exemplified as the transmission, but the present disclosure is not limited thereto, and the transmission may be an automatic transmission (AT), a dual clutch transmission (DCT) or a continuously variable transmission (CVT).

In addition, any of the aforementioned embodiment described above is only illustration of an exemplary embodiment for implementing the present disclosure, and the technical scope of the present disclosure shall not be construed limitedly thereby. That is, the present disclosure can be implemented in various forms without departing from the gist or the main features thereof.

This application is based on Japanese Patent Application No. 2020-026289, filed on Feb. 19, 2020, the disclosure of which is incorporated herein by reference in its entirety.

INDUSTRIAL APPLICABILITY

The gear position selection apparatus of the present disclosure is useful as a gear position selection apparatus and a vehicle each capable of suppressing an insufficient driving force of the vehicle due to a limitation on a selection range of gear positions by a vehicle-start gear position.

REFERENCE SIGNS LIST

1 Vehicle
2 Propeller shaft
3 Differential gear
4 Driving wheel
5 Engine
6 Transmission
100 Gear position selection apparatus
110 Setting section
120 Selection section
130 Changing section

What is claimed is:

1. A gear position selection apparatus of a transmission including a plurality of gear positions, the plurality of gear positions including two or more gear positions set for a vehicle-start gear position of a vehicle, the gear position selection apparatus comprising:
a setting section that sets a selection range of the plurality of gear positions selectable between when the vehicle starts moving and when the vehicle stops moving during automatic transmission traveling, the selection range being a range in which, among the two or more gear positions, a first gear position of the two or more gear positions used as the vehicle-start gear position is a lowest-speed gear position; and
a changing section that changes, in accordance with the first gear position used as the vehicle-start gear position, the selection range such that the lowest-speed gear position is a second gear position of the two or more gear positions that is a lower-speed gear position than the first gear position.

2. The gear position selection apparatus according to claim 1, wherein the changing section changes the selection range in a case where the first gear position is a higher-speed gear position than a gear position that is lowest in speed in a setting range for the vehicle-start gear position.

3. The gear position selection apparatus according to claim 2, wherein the changing section changes the selection range in a case where the first gear position is a gear position included in, between a higher-speed side and a lower-speed side in the setting range, the higher-speed side.

4. The gear position selection apparatus according to claim 1, wherein the changing section changes the selection range in a case where the first gear position is a gear position set for the vehicle-start gear position when a gradient of a road surface when the vehicle starts moving is a downward gradient.

5. The gear position selection apparatus according to claim 1, wherein the changing section changes the selection range in a case where the vehicle travels at a predetermined speed after the vehicle starts moving.

6. The gear position selection apparatus according to claim 1, wherein the changing section changes the selection range in a case where a gear position in the transmission is changed from the first gear position after the vehicle starts moving.

7. The gear position selection apparatus according to claim 1, wherein the changing section determines whether the selection range is changed in accordance with a gradient of a road surface on which the vehicle travels.

8. The gear position selection apparatus according to claim 1, comprising a selection section that performs selection of one gear position from the selection range in accordance with a traveling condition of the vehicle, wherein
the setting section sets a gear position based on a result of the selection by the selection section.

9. A vehicle, comprising:
a transmission including a plurality of gear positions, the plurality of gear positions including two or more gear positions set for a vehicle-start gear position of a vehicle; and
the gear position selection apparatus according to claim 1.

* * * * *